(12) United States Patent
Modtland et al.

(10) Patent No.: US 8,608,386 B2
(45) Date of Patent: Dec. 17, 2013

(54) JOURNAL BEARING DESIGN

(75) Inventors: Curtis Modtland, Lake Jackson, TX (US); Hua Bai, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 143 days.

(21) Appl. No.: 13/141,304

(22) PCT Filed: Dec. 7, 2009

(86) PCT No.: PCT/US2009/066989
§ 371 (c)(1),
(2), (4) Date: Jun. 21, 2011

(87) PCT Pub. No.: WO2010/080281
PCT Pub. Date: Jul. 15, 2010

(65) Prior Publication Data
US 2011/0268378 A1    Nov. 3, 2011

Related U.S. Application Data

(60) Provisional application No. 61/144,055, filed on Jan. 12, 2009.

(51) Int. Cl.
*F16C 32/06*    (2006.01)
*F16C 33/10*    (2006.01)

(52) U.S. Cl.
USPC ............................ 384/292; 384/120

(58) Field of Classification Search
USPC .................. 384/120, 283, 291, 292
See application file for complete search history.

(56) References Cited

U.S. PATENT DOCUMENTS

| | | | | |
|---|---|---|---|---|
| 1,731,790 A * | 10/1929 | Payne | ..................... | 29/898.058 |
| 3,484,143 A * | 12/1969 | Sibley et al. | ................. | 384/108 |
| 5,746,516 A * | 5/1998 | Miyasaka et al. | ............. | 384/291 |
| 6,398,416 B1 * | 6/2002 | Kurz et al. | ..................... | 384/279 |
| 7,234,871 B2 * | 6/2007 | Maruyama et al. | ........... | 384/292 |
| 8,096,709 B2 * | 1/2012 | Maruyama et al. | ........... | 384/292 |
| 2003/0190102 A1 * | 10/2003 | Horng et al. | ................. | 384/292 |
| 2004/0042698 A1 | 3/2004 | Yamamoto et al. | ........... | 384/291 |
| 2005/0286822 A1 | 12/2005 | Maruyama et al. | ........... | 384/283 |

FOREIGN PATENT DOCUMENTS

| CN | 1712748 | 12/2005 | ............. F16C 33/10 |
|---|---|---|---|
| EP | 1617090 | 1/2006 | ............. F16C 33/10 |

OTHER PUBLICATIONS

International Preliminary Report on Patentability; PCT/US2009/066989; pp. 8, Jul. 12, 2011.
International Search Report and the Written Opinion of the International Searching Authority for PCT/US2009/066989, 16 pages, Mailing Date Feb. 16, 2010.

(Continued)

*Primary Examiner* — Phillip A Johnson
(74) *Attorney, Agent, or Firm* — Baker Botts L.L.P.

(57) ABSTRACT

The present disclosure relates to bearings, for example, an improved journal bearing. A bushing (44) for use with a journal bearing (40) includes: a cylindrical interior defining an interior bearing surface (46); a longitudinal axis (45) and an internal diameter (ID); a groove region of the interior bearing surface (46) having a length H along the longitudinal axis; and a set of grooves (48) in the grooved region of the interior bearing surface (46), where N is the number of grooves in the set of grooves (48). Each groove is disposed at a helix angle ($\theta$) offset from the longitudinal axis (45) of the bushing (44). The helix angle is approximately equivalent to the following equation: tangent $(\theta) = (\pi \times ID)/(N \times H)$.

15 Claims, 4 Drawing Sheets

(56) References Cited

OTHER PUBLICATIONS

Translation of First Chinese Office Action; Application No. 200980154371.2; pp. 7, Dec. 4, 2012.

European Office Action; Application No. 09 765 215.0-2424 ; pp. 4, Feb. 7, 2013.
English translation of Japanese Office Action; Application No. 2011-545358; pp. 3, Mar. 5, 2013.

* cited by examiner

JOURNAL BEARING DESIGN

CROSS-REFERENCE TO RELATED APPLICATIONS

This application is a 371 U.S. national application of International Application Number PCT/US2009/066989 filed Dec. 7, 2009, which designates the United States; and claims the benefit of U.S. Provisional Application No 61/144,005 filed on Jan. 12, 2009, which are incorporated herein in its entirety.

FIELD OF THE DISCLOSURE

The present disclosure relates in general to bearings for use with rotating equipment. Additionally, the present disclosure relates to an improved design for journal bearings.

BACKGROUND OF THE DISCLOSURE

Bearings are typically used in rotating equipment to allow relative motion between two parts. For example, a ball bearing or a roller bearing may be used to allow a shaft to rotate within a fixed housing. A journal bearing is a simple bearing for use with a rotating shaft. In a journal bearing, the "journal" refers to a portion of the shaft and the "bushing" is a hollow cylinder surrounding the journal. The bushing is set into a housing or other casing which may be called the "journal box."

Typically, both the journal and the bushing are smooth polished cylinders. The gap between the journal and the bushing may be referred to as the "clearance" of the bearing. In a journal bearing, a lubricant is added within the clearance between the journal and the bushing. The lubricant is typically viscous enough to provide a cushion between the rotating journal and the stationary bushing.

FIG. 1 illustrates an example of a prior art system including a rotating device 1. Rotating device 1 may include any sort of rotating equipment (e.g., a motor, a pump, etc.). Rotating device 1 includes a stationary housing 10 with an end cap 12 and a journal box 14. Rotating device 1 also includes a rotating shaft 20 with a rotating element 22 and a journal bearing 24. Rotating element 22 may include any component of rotating device 1 (e.g., a rotor, an impeller, etc.).

FIGS. 2A-2D illustrate various aspects of prior art journal bearing 24. FIG. 2A shows a longitudinal cross-section of a bushing 26 with a bushing interior surface 28. Bushing 26 is a hollow cylinder configured to house a journal 27. FIG. 2B shows journal 27 having a journal exterior surface 29. As shown in FIG. 2C, journal 27 rests inside bushing 26 to form bearing 24.

FIG. 2D shows a cross-section of bearing 24 taken along line 2D-2D shown in FIG. 2C, with arrow 30 showing the direction of rotation of rotating shaft 20 and journal 27. The gap between bushing 26 and journal 27 is a clearance 34. A lubricant 32 is introduced into clearance 34. The rotation of journal 27 within bushing 26 creates a "wedge" of lubricant 32. Journal 27 rests on the wedge of lubricant 32 without coming in direct contact with bushing 26.

In some applications, lubricant 32 is circulated through the interior of rotating device 1 and any bearings 24 to both remove heat and provide lubrication. In normal canned motor applications, the amount of lubricant 32 adequate to cool bearing 24 is smaller than the amount of lubricant 32 needed to cool the motor and/or its components. In those applications, some portion of lubricant 32 bypasses bearing 24 avoiding the pressure drop attendant to passing through clearance 34—there is a high resistance to flow through the clearance 34 of many journal bearings. The design of a close clearance journal bearing is significantly constrained by the balance between the pressure drop of the lubricant and the minimum allowable flow rate. In addition, as the rate of rotation of rotational device 1 increases, so does the resistance to flow through clearance 34. Some journal bearings include one or more grooves in a bearing surface—reducing the resistance to flow through the clearance.

SUMMARY

The present disclosure relates, according to some embodiments, to journal bearings. As an example, the teachings of the present disclosure provide a bushing for use in a journal bearing. The bushing may include a cylindrical interior defining an interior bearing surface, a longitudinal axis and an internal diameter (ID), a grooved region of the interior bearing surface having a length H along the longitudinal axis, and a set of grooves in the grooved region of the interior bearing surface, where N is the number of grooves in the set of grooves. Each groove may be disposed at a helix angle ($\theta$) offset from the longitudinal axis of the bushing. The helix angle may be approximately equivalent to the following equation:

$$\tangent(\theta) = (\pi \times ID)/(N \times H).$$

As another example, the present disclosure provides a bushing for use in a journal bearing. The bushing may include a cylindrical interior defining an interior bearing surface, a longitudinal axis running through the center of the cylindrical interior, a grooved region of the interior bearing surface having a length H along the longitudinal axis, and a set of helical grooves in the grooved region of the interior bearing surface. Further, any straight line extending along the grooved region of the interior bearing surface in a direction parallel to the longitudinal axis may intersect one and only one groove of the set of helical grooves.

As another example, the present disclosure provides a bearing for use with rotating equipment. The bearing may include a bushing having a cylindrical interior defining an interior bearing surface, the bushing having a longitudinal axis and an internal diameter (ID), a journal mounted on a rotating shaft and configured to rotate within the bushing, the journal having a cylindrical exterior defining an external bearing surface, a grooved region of the interior bearing surface of the bushing having a length H along the longitudinal axis of the bushing, and a set of grooves in the grooved region of the interior bearing surface of the bushing, where N is the number of grooves in the set of grooves. Each groove may be disposed at a helix angle ($\theta$) offset from the longitudinal axis of the bushing. Further, the helix angle may be approximately equivalent to the following equation:

$$\tangent(\theta) = (\pi \times ID)/(N \times H).$$

As another example, the present disclosure provides a bearing for use with rotating equipment. The bearing may include a bushing having a cylindrical interior defining an interior bearing surface, the bushing having a longitudinal axis running through the center of the cylindrical interior, a journal mounted on a rotating shaft and configured to rotate within the bushing, the journal having a cylindrical exterior defining an external bearing surface, a grooved region of the interior bearing surface having a length H along the longitudinal axis, and a set of helical grooves in the grooved region of the interior bearing surface. Any straight line extending along the grooved region of the interior bearing surface in a direction parallel to the longitudinal axis may intersect one and only one groove of the set of helical grooves.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Embodiments of the present disclosure and their advantages are best understood by reference to FIGS. 3-8, wherein like numbers are used to indicate like and corresponding parts. Although the present discussion focuses on the application of the present teachings in bushings for use in journal bearings with canned motor pumps, the teachings may have applications in other rotating equipment. For example, teachings of the present disclosure may be used to improve journals for use in journal bearings. As another example, journal bearings embodying aspects of the present disclosure may be used in vertically, horizontally, and/or otherwise aligned applications.

Figure 1:
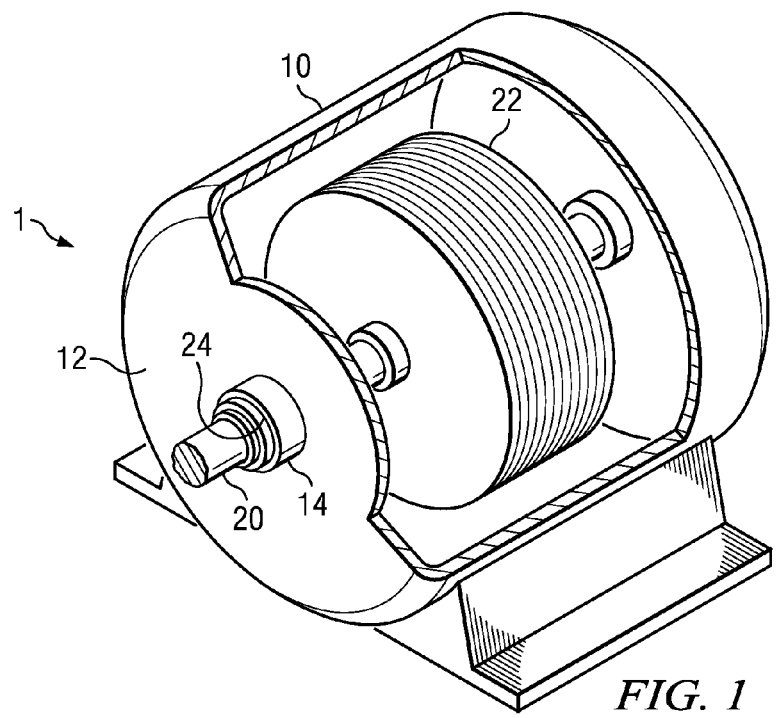
FIG. 1 illustrates an example of a prior art system including rotating equipment and a journal bearing.
Figure 2A:
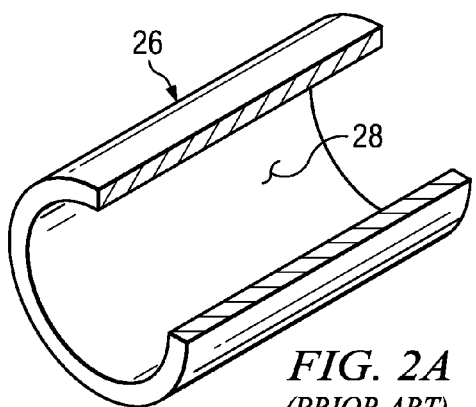
FIGS. 2A-2D illustrate various aspects of an example prior art journal bearing.
Figure 2B:
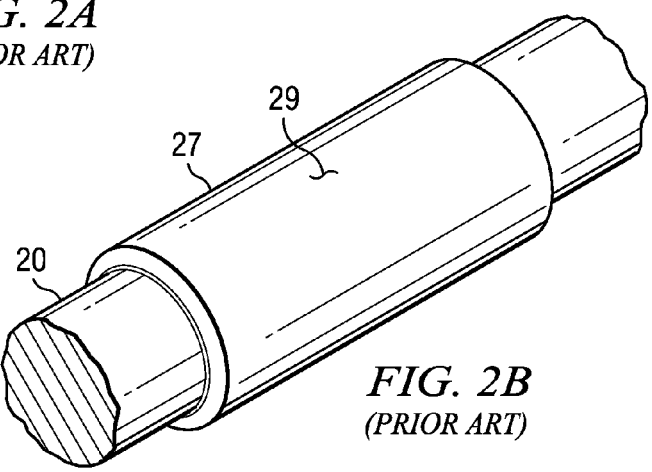
Figure 2C:
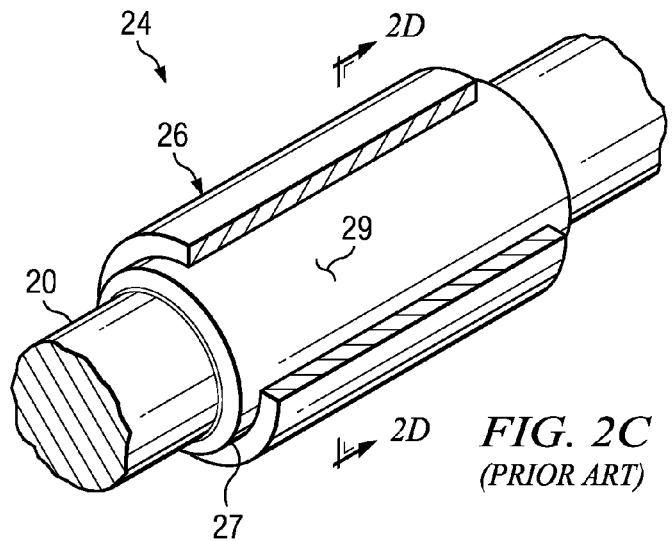
Figure 2D:
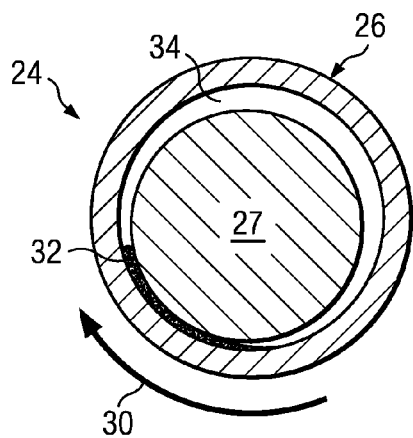
Figure 3:
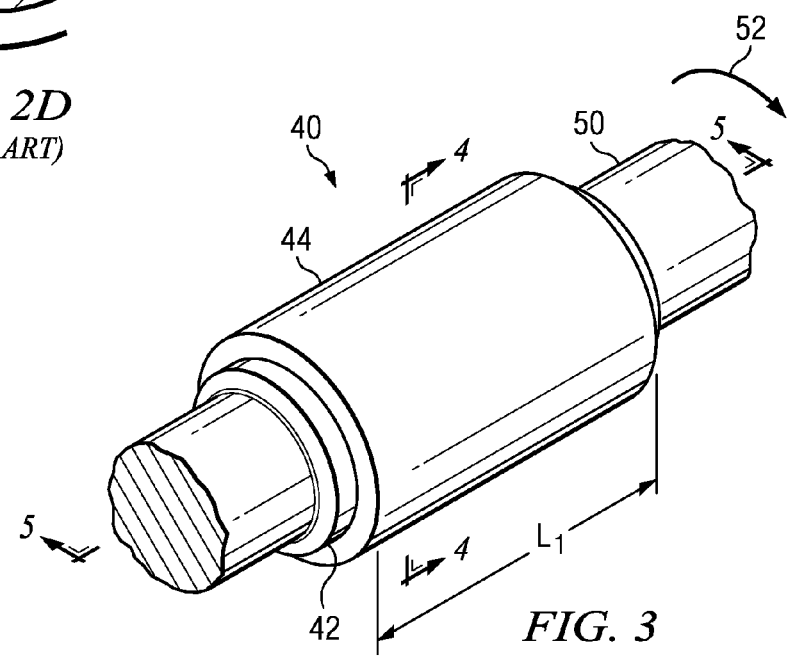
FIG. 3 illustrates an example bearing incorporating teachings of the present disclosure.

FIG. 3 illustrates an example journal bearing 40 incorporating teachings of the present disclosure. Journal bearing 40 may include a journal 42 and a bushing 44. The difference between the outer diameter of journal 42 and the inner diameter of bushing 44 may define a clearance 41 (shown in FIG. 4). Journal 42 may be mounted on rotating shaft 50, and/or may be integral with rotating shaft 50. Rotating shaft 50 and journal 42 rotate as a single unit in the direction shown by arrow 52. Bushing 44 may have a longitudinal axis 45 (shown in FIG. 5) generally aligned with rotating shaft 50. Bushing 44 may have a length, shown in FIG. 3 as $L_1$.

Figure 4:
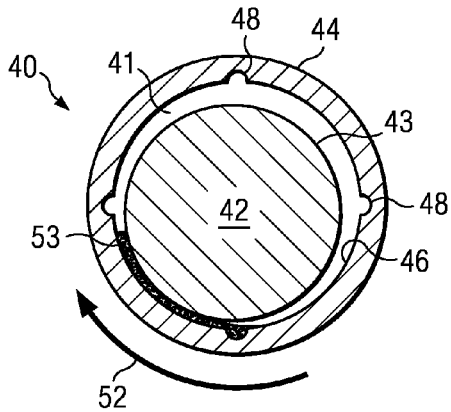
FIG. 4 illustrates a cross-section of the bearing from FIG. 3 along line 4-4.

FIG. 4 illustrates a cross-section of journal bearing 40 from FIG. 3 along line 4-4. As shown in FIG. 4, bushing 44 may encircle journal 42. The space between journal 42 and bushing 44 may define clearance 41. Journal bearing 40 may include a set of grooves 48 in one of the bearing surfaces. For example, as shown in FIG. 4, journal bearing 40 may include a set of grooves 48 in an interior bearing surface 46 of bushing 44. As another example, journal bearing 40 may include a set of grooves 48 in an exterior bearing surface 43 of journal 42. If grooves are added to one of the bearing surfaces 43, 46 in a journal bearing, the resistance to fluid flow through clearance 41 may be reduced. Reduced resistance to fluid flow through clearance 41 may increase the volume flow rate of fluid through clearance 41 which may, in turn, provide increased cooling and/or bearing life without a required increase in fluid pressure.

Figure 5:
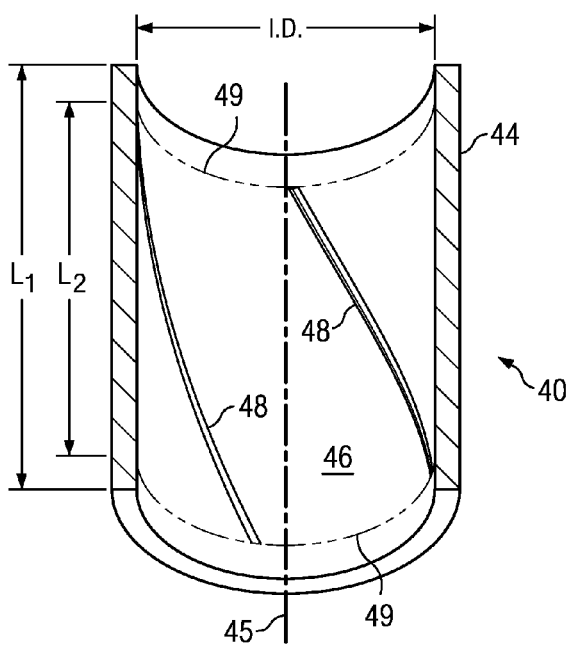
FIG. 5 illustrates a cross-section of the bearing from FIG. 3 along line 5-5.

FIG. 5 illustrates a cross-section of bushing 44 from FIG. 3 along line 5-5. As shown in FIG. 5, bushing 44 may include a cylindrical interior defining interior bearing surface 46. The cylindrical interior may define longitudinal axis 45. Interior bearing surface 46 may include a soft material lining the cylindrical interior of bushing 44. One example material for lining the cylindrical interior of bushing 44 may be commonly known as "babbit." Babbit may include a tin- and/or a lead-based alloy. A lining made of babbit and/or another suitable material may protect rotating shaft 50 or journal 42 from damage (e.g., marring and/or gouging) if journal 42 comes into contact with bushing 44. In addition, a lining of babbit may allow any contaminant occurring in lubricant 53 to imbed in the lining without damaging journal 42.

Bushing 44 may include one or more grooves 48 in interior bearing surface 46. The portion of bushing 44 including groove 48 may be described as a grooved region. In some embodiments, the grooved region is the region extending in the direction of longitudinal axis 45 to include grooves 48. For example, in the embodiment shown in FIG. 5, the grooved region is the region of interior bearing surface 46 bounded by imaginary lines 49 that extend perpendicular to longitudinal axis 45. As shown in FIG. 5, the grooved region may have a length $L_2$. In other embodiments, the length of the grooved region ($L_2$) may be approximately equivalent to $L_1$.

FIGS. 4 and 5, as an example, show a grooved region with four (4) grooves 48 in interior bearing surface 46. The grooved region may be may be described as having a number of grooves 48, defining N as that number. A discrete groove would include any single continuous groove 48 in the grooved region.

Bushing 44 may include a single groove 48 or a set of N grooves 48 in the grooved region. As discussed in relation to FIG. 4, the addition of groove(s) 48 to a bearing surface 43, 46 of journal bearing 40 may decrease the resistance to fluid flow through clearance 41. The addition of groove(s) 48 to a bearing surface 43, 46 of journal bearing 40, however, may also reduce the load carrying capacity of journal bearing 40. The particular design and geometry of the groove(s) 48 may affect both the resistance to fluid flow through clearance 41 and the load carrying capacity of journal bearing 40.

The load carrying capacity of a journal bearing is related to the effective hydrodynamic surface area of the bearing surfaces. Typically, a grooved surface offers less total hydrodynamic surface area than a smooth surface. One challenging aspect of designing a set of grooves 48 for a bearing surface 43, 46 of a journal bearing is to increase the rate of fluid flow through clearance 41 without significantly reducing the load carrying capacity of journal bearing 40.

Figure 6:
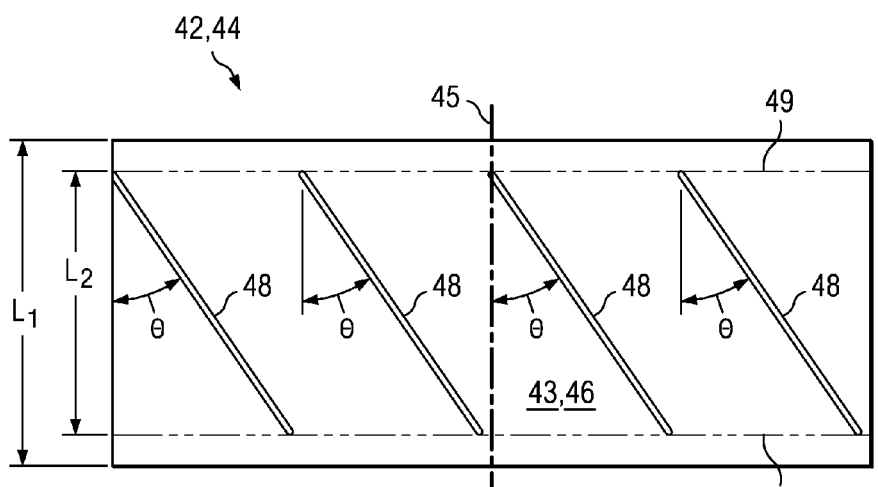
FIG. 6 illustrates selected aspects of an example bushing incorporating teachings of the present disclosure.

FIG. 6 illustrates an example design for groove(s) 48 for use in a bearing surface 43, 46 of journal bearing 40. FIG. 6 shows bearing surface 43, 46 unrolled as if a flat surface, merely for illustrative purposes. The design for groove(s) 48 shown in FIG. 6 may be implemented on bearing surface 46 of bushing 44 as shown in FIG. 5 and/or on bearing surface 43 of journal 42. As shown in FIG. 6, imaginary lines 49 may bound the grooved region of bearing surface 43, 46. The grooved region of bearing surface 43, 46 may have a length, $L_2$, as discussed above regarding FIG. 5).

The design shown in FIG. 6 includes four grooves 48 (N=4) extending at angle θ relative to longitudinal axis 45. Although the example shown in FIG. 6 includes four grooves, persons having ordinary skill in the art may implement the teachings of the present disclosure with any number of grooves. θ of the groove(s) may be defined by the following equation:

$$\tangent(\theta) = (\pi \times D)/(N \times H). \qquad (\text{Eq. 1})$$

Wherein θ is the helix angle between groove 48 and longitudinal axis 45, D is the diameter of the cylindrical bearing surface, N is the number of grooves, and H is the length of the grooved region of the bearing surface. Because (π×D) is the circumference of the cylindrical bearing surface, (π×D)/N is the circumferential length covered by each groove 48. Persons having ordinary skill in the art may be able to vary θ around the value defined by Equation 1. For example, increasing θ may provide an overlap of grooves 48 at either end of the grooved region of the bearing surface. As another example, decreasing θ may provide a gap between the ends of the grooves 48 at either end of the grooved region of the bearing surface. As an example, the helix angle may be chosen between 0.5 times θ and 1.5 times θ. As another example, the helix angle may be chosen between 0.9 times θ and 1.1 times θ.

In bearing 40, the grooved region may be in either or both bearing surfaces (e.g., interior bearing surface 46 of bushing 44 and/or exterior bearing surface 43 of journal 42). When determining a helix angle, θ, for grooves 48, one may use the average diameter of the journal and the bushing (e.g., journal exterior diameter plus the bushing interior diameter, all divided by two). In many journal bearings, the clearance between the journal and the bearing may be relatively small in comparison to the diameter of the journal and/or the diameter of the bushing. In example bearings incorporating teachings of the present disclosure, the design of grooves 48 may include setting a helix angle θ using the following formula.

$$\tan(\theta) = (\pi \times (D1+D2))/(2 \times N \times H). \quad \text{(Eq. 2)}$$

Wherein θ is the helix angle between groove 48 and longitudinal axis 45, D1 is the diameter of the of the bushing interior bearing surface, D2 is the diameter of the journal exterior bearing surface, N is the number of grooves, and H is the length of the grooved region of the bearing surface. In these embodiments, (D1+D2)/2 provides an average of the two diameters. Because (π×(D1+D2))/2 is the circumference of the average diameters, (π×(D1+D2))/2×N is the circumferential length covered by each groove 48. Persons having ordinary skill in the art may be able to vary θ around the value defined by Equation 2. For example, increasing θ may provide an overlap of grooves 48 at either end of the grooved region of the bearing surface. As another example, decreasing θ may provide a gap between the ends of the grooves 48 at either end of the grooved region of the bearing surface. As an example, the helix angle may be chosen between 0.5 times θ and 1.5 times θ. As another example, the helix angle may be chosen between 0.9 times θ and 1.1 times θ.

As another example, each groove 48 may be described by its turn. The turn of each groove 48 is the portion of the circumference that groove 48 covers. For example, a single groove 48 that makes one rotation around circumference of bearing surface 43, 46 may be described as making one turn. A set of four groove(s) 48 shown in FIG. 6 that each covers one fourth of the circumference of bearing surface 43, 46 may be described as making a quarter turn or 0.25 turns. In embodiments of journal bearing 40 incorporating the teachings of the present disclosure, each groove 48 may have a turn approximately equivalent to one over the number of grooves.

$$\text{groove turn} = 1/N. \quad \text{(Eq. 3)}$$

Some benefits of a journal bearing incorporating the teachings of the present disclosure may include reduced resistance to fluid (e.g., lubricant) flow through clearance 41. Reduced resistance may allow increased volume flow for a constant pressure. Increased volume flow through clearance 41 may improve the temperature control of journal bearing 40 and/or the useful life span of journal bearing 40. Increased bearing life may, in turn, improve the reliability of a piece of rotating equipment incorporating journal bearing 40. In embodiments of journal bearing 40 including a set of grooves 48, a groove design that reduces flow path length through clearance 41 may also reduce the loss of bearing surface area. Selection of grooves with a turn approximately equal to that defined by Equation 3 may also provide increased bearing life. For example, one bearing design may include grooves with a turn between 50% and 150% of the turn defined by Equation 3. As another example, one bearing design may include grooves with a turn between 90% and 110% of the turn defined by Equation 3.

The selection of the number of grooves 48, N, in the set of grooves may depend on multiple variables and/or considerations. For example, the operation of the equipment including bearing 40 may provide a range of acceptable pressure drop across bearing 40, an expected rotational speed of journal 42, and/or the viscosity of fluid used in bearing 40. In some cases, a person having ordinary skill in the art may choose N to provide a helix angle, θ, similar to a flow angle provided by the geometry and operation of the bearing. As an example, one design may include between 1 and 10 grooves. As another example, a design may include between 1 and 5 grooves.

Along with varying N, the number of grooves 48 in the set of grooves, a person having ordinary skill in the art may choose to vary the turn or the helix angle of the one or more grooves 48. One design that may reduce flow path length includes axial grooves parallel to longitudinal axis 45 (i.e., θ=0). Axial grooves provide increased flow through journal bearing 40 in comparison to a smooth journal bearing surfaces but suffer a relatively large reduction in bearing surface area and, therefore, load bearing capacity. In addition, axial grooves are not radially symmetric, so the load bearing capacity of a journal bearing including axial grooves is highly dependent on the orientation of the grooved surface.

In contrast, a set of grooves 48 with a helix angle approximately equal to θ according to equation 1 may reduce resistance to fluid flow through clearance 41 without significantly reducing the load bearing capacity of journal bearing 40. A set of grooves 48 in accordance with the teachings of this disclosure (e.g., according to FIG. 6, FIG. 7, or FIG. 8) may provide a radially symmetric bearing—any radial line parallel to longitudinal axis 45 crosses exactly one groove 48.

Modeling an example journal bearing 40a similar to that shown in FIG. 6 using Computational Fluid Dynamics (CFD) demonstrates a surprising and unexpected amount of reduction in resistance to fluid flow through clearance 41 when compared to other journal bearing designs. Example journal bearing 40a included four grooves 48a in bearing surface 46a of bushing 44a. Grooves 48a included four semicircular grooves with a 3 mm radius. Grooves 48a each had a helix angle θ of approximately 52.6°. The interior diameter of bushing 44a was 80.188 mm. The length, $L_2$, of the grooved area was 82.5 mm. Example journal bearing 40a included 0.1525 mm clearance 41a. Example journal bearing 44a was compared to similar journal bearings without grooves 48.

Four designs for a journal bearing were modeled with equivalent situations (e.g., the same length, journal diameter, bushing diameter, clearance, pressure drop across the bearing, journal rotation speed, fluid properties, etc.). A smooth journal bearing with no grooves (Bearing A) allowed 338 pounds/hour of fluid to pass through the bearing. A journal bearing with two spiral grooves having a helix angle of approximately nine degrees (9°) (Bearing B) allowed 1554 pounds/hour of fluid to pass through the bearing. A journal bearing with three equally spaced axial grooves (Bearing C)

allowed 1647 pounds/hour of fluid to pass through the bearing. Journal bearing 40*a* (e.g., four grooves with a helix angle θ determined according to equation 1) allowed 2869 pounds/hour of fluid to pass through the bearing—significantly improved over all of the other tested designs.

Using CFD to model the load carrying capacity of the same four designs demonstrates an increased load carrying capacity for example journal bearing 40*a* when compared to the other grooved designs. When compared to Bearing A (smooth bearing surfaces), Bearing B had a load carrying capacity reduced by 34% and Bearing C had a load carrying capacity reduced by between 40% and 51% depending on the orientation of the radial load. Journal bearing 40*a* (e.g., four grooves with a helix angle θ determined according to equation 1) showed a load carrying capacity reduced by 29.8% when compared to Bearing A.

Journal bearing 40*a* (e.g., four grooves with a helix angle θ determined according to equation 1) demonstrated the most reduced resistance to fluid flow through its clearance and the least reduced load carrying capacity. This improved performance may be affected by the design of the set of grooves 48. Journal bearing 40 incorporating teachings of the present disclosure may provide radial symmetry with only a single interruption of the of the bearing hydrodynamic film or wedge along the axial length of the bearing surface.

Figure 7:
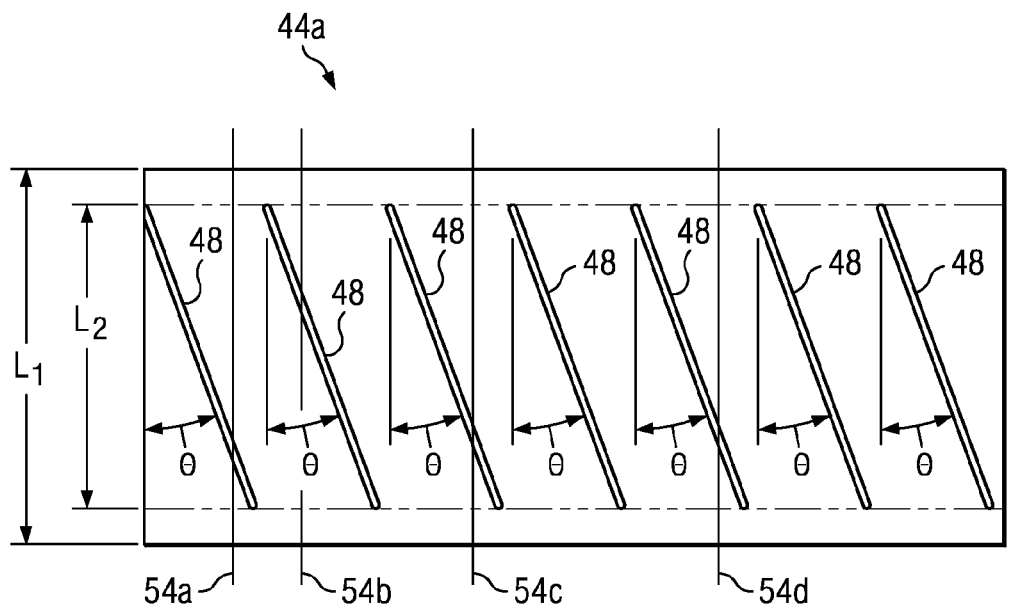
FIGS. 7 and 8 illustrate selected aspects of an example bushing incorporating teachings of the present disclosure.
Figure 8:
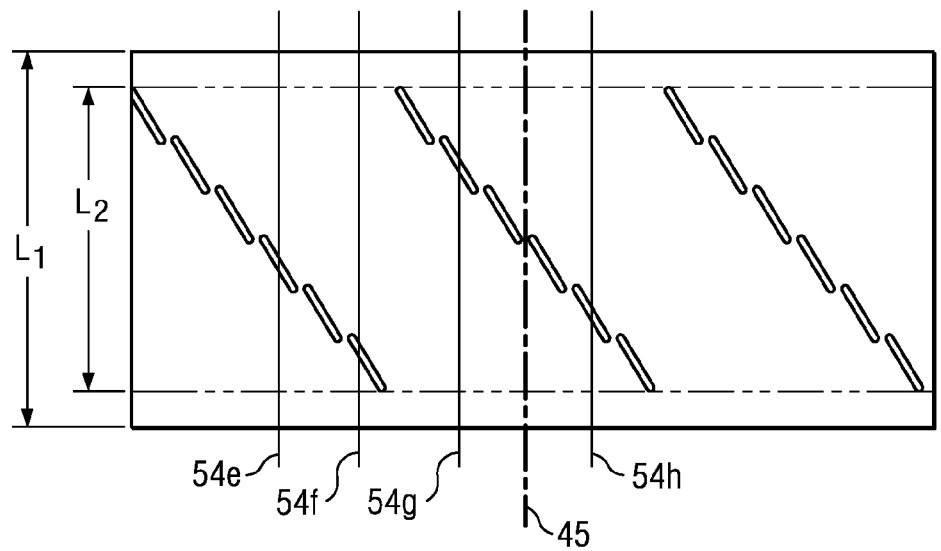

FIGS. 7 and 8 illustrate example arrangements of grooves 48 on a bearing surface of journal bearing 40 in accordance with teachings of the present disclosure. Each groove 48 may be located so that an imaginary line 54 extending parallel to longitudinal axis 45 intersects one and only one groove 48. As shown in FIGS. 7 and 8, imaginary lines 54*a*-54*h* each intersect one and only one groove 48. The number and length of each groove 48 may vary while maintaining a helix angle approximately equal to θ according to equation 1.

Although the figures and embodiments disclosed herein have been described with respect to journal bearings, it should be understood that various changes, substitutions and alternations can be made herein without departing from the spirit and scope of the disclosure as illustrated by the following claims. For example, one having ordinary skill in the art may choose to vary the helix angle, θ, of the grooves around the value defined by Equation 1. As another example, one having ordinary skill in the art may choose to vary the turn of one or more grooves around the value defined by Equation 2.

The invention claimed is:

1. A bushing for use with a journal bearing, the bushing comprising:
   a cylindrical interior defining an interior bearing surface;
   a longitudinal axis and an internal diameter ID;
   a grooved region of the interior bearing surface having a length H along the longitudinal axis; and
   a set of grooves in the grooved region of the interior bearing surface, wherein N is the number of grooves in the set of grooves;
   wherein each groove is disposed at a helix angle θ offset from the longitudinal axis of the bushing; and
   wherein:

$$\tangent(\theta) = (\pi \times ID)/(N \times H).$$

2. A bushing according to claim 1, wherein the set of grooves includes between one and ten grooves.

3. A bushing according to claim 1, wherein the set of grooves includes between one and five grooves.

4. A bushing for use with a journal bearing, the bushing comprising:
   a cylindrical interior defining an interior bearing surface;
   a longitudinal axis running through the center of the cylindrical interior;
   a grooved region of the interior bearing surface having a length H along the longitudinal axis; and
   a set of helical grooves in the grooved region of the interior bearing surface;
   wherein any straight line extending along the grooved region of the interior bearing surface in a direction parallel to the longitudinal axis intersects one and only one groove of the set of helical grooves.

5. A bushing for use with a journal bearing, the bushing comprising:
   a cylindrical interior defining an interior bearing surface, the cylindrical interior having a circumference;
   a set of helical grooves in the interior bearing surface, the number of helical grooves defining a value N;
   each groove in the set of helical grooves extending around a portion of the circumference; and
   each groove of the set of helical grooves in the interior bearing surface having a turn, the turn of a groove defined as a fraction of the circumference over which the respective groove extends;
   wherein the turn of each groove is one divided by N.

6. A bushing according to claim 5, wherein the number of helical grooves in the set of helical grooves is between 1 and 10.

7. A bushing according to claim 5, wherein the number of helical grooves in the set of helical grooves is between 1 and 5.

8. A bearing for use with rotating equipment, the bearing comprising:
   the bearing having a longitudinal axis;
   a bushing having a cylindrical interior defining an interior bearing surface, the cylindrical interior having a first diameter D1;
   a journal mounted on a rotating shaft and configured to rotate within the bushing, the journal having a cylindrical exterior defining an external bearing surface, the cylindrical exterior having a second diameter D2;
   a grooved region located on one surface, the one surface selected from the external bearing surface and the interior bearing surface, the grooved region having a length H along the longitudinal axis of the bearing; and
   a set of grooves in the grooved region, wherein N is the number of grooves in the set of grooves;
   each groove disposed at a helix angle θ offset from the longitudinal axis of the bearing;
   wherein any straight line extending along the grooved region of a bearing surface in a direction parallel to the longitudinal axis intersects one and only one groove of the set of grooves.

9. A bearing according to claim 8, wherein:
   the grooved region is located on the interior bearing surface of the bushing; and
   wherein:

$$\tangent(\theta) = (\pi \times D1)/(N \times H).$$

10. A bearing according to claim 8, wherein:
    the grooved region is located on the exterior bearing surface of the journal; and
    wherein:

$$\tangent(\theta) = (\pi \times D2)/(N \times H).$$

11. A bearing according to claim 8, wherein the set of grooves includes between one and ten grooves.

12. A bearing according to claim 8, wherein the set of grooves includes between one and five grooves.

13. A bearing according to claim 8, wherein:

$$\tangent(\theta) = (\pi \times (D1+D2))/(2 \times N \times H).$$

14. A bearing for use with rotating equipment, the bearing comprising:
- a bushing having a cylindrical interior defining an interior bearing surface;
- a journal mounted on a rotating shaft and configured to rotate within the bushing, the journal having a cylindrical exterior defining an external bearing surface;
- a longitudinal axis running through the center of the cylindrical interior of the bushing;
- a grooved region located on one surface, the one surface selected from the external bearing surface and the interior bearing surface, the grooved region of the bearing having a length H along the longitudinal axis; and
- a set of helical grooves in the grooved region of the bearing surface;

wherein any straight line extending along the grooved region of the bearing surface in a direction parallel to the longitudinal axis intersects one and only one groove of the set of helical grooves.

15. A bearing for use with rotating equipment, the bearing comprising:
- a bushing having a cylindrical interior defining an interior bearing surface, the cylindrical interior having a first circumference C1;
- a journal mounted on a rotating shaft and configured to rotate within the bushing, the journal having a cylindrical exterior defining an external bearing surface having a second circumference C2;
- a set of helical grooves in one of the bearing surfaces, the number of helical grooves defining a value N;
- each groove in the set of helical grooves extending around a portion of a circumference of the bearing surface selected from the first circumference C1 and the second circumference C2; and
- each groove of the set of helical grooves in the interior bearing surface having a turn, the turn of a groove defined as the fraction of the circumference travelled by the respective groove;

wherein the turn of each groove is one divided by N.

* * * * *